March 19, 1935.   R. H. HOSKINS   1,995,251
TRIMMING DEVICE
Filed Aug. 4, 1933
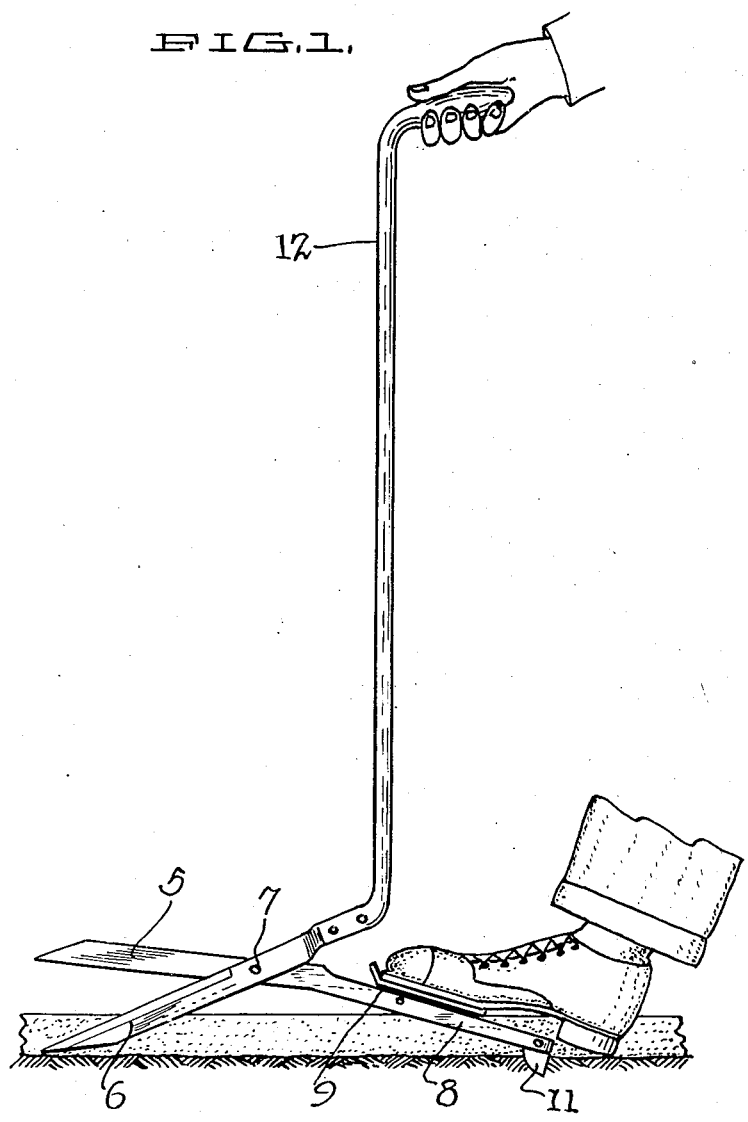
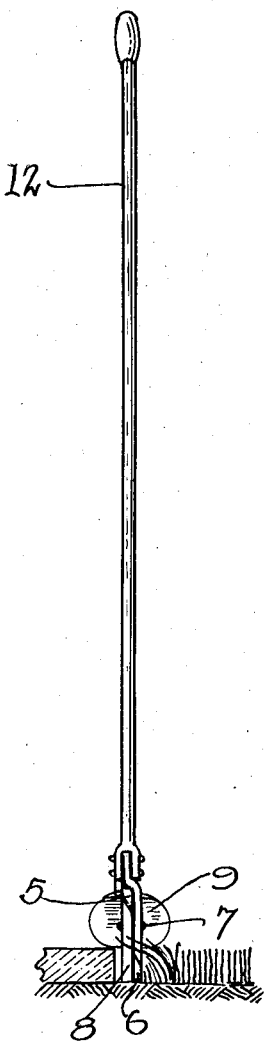
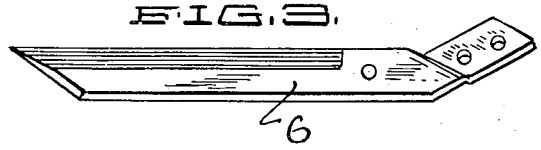
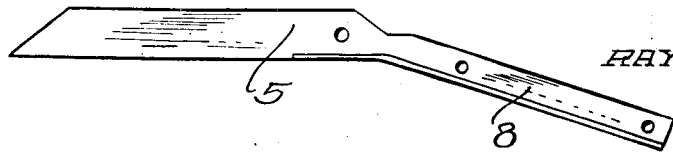
INVENTOR
RAYMOND H. HOSKINS
BY Victor J. Evans & Co
ATTORNEYS.

Patented Mar. 19, 1935

1,995,251

UNITED STATES PATENT OFFICE 1,995,251

TRIMMING DEVICE

Raymond H. Hoskins, Long Beach, Calif.

Application August 4, 1933, Serial No. 683,706

1 Claim. (Cl. 56—241)

This invention relates to improvements in trimming devices and has particular reference to a device for trimming a lawn, and particularly the edge thereof, as for instance adjacent a walk or flower bed.

A further object is to produce a device which is simple in construction and therefore, economical to manufacture.

A further object is to produce a device which may be readily manipulated without requiring the operator to kneel, in order to effect the trimming operation.

A still further object is to provide for an automatic advancement of the trimming elements as the device is operated.

Other objects and advantages will be apparent during the course of the following description.

In the accompanying drawing forming a part of this specification and in which like numerals are employed to designate like parts throughout the same, Fig. 1 is a side elevation of my device, as the same would appear in use, Fig. 2 is a front elevation of the device, and Figs. 3 and 4 are views of the respective trimming elements.

It is customary to trim grass adjacent walks, flower beds and the like, so as to present a neat appearance. Applicant has, therefore, devised a trimmer which may be operated by the person while in a standing position, in counter-distinction to the customary hand-operated trimming shears which require the user to crawl upon the hands and knees during the trimming or cutting operation. With applicant's device, the trimming may be accomplished while in an erect position.

In the accompanying drawing wherein for the purpose of illustration is shown a preferred embodiment of my invention, the numerals 5 and 6 designate the trimming blades or cutting elements. The blade 5 is pivoted to the blade 6, as at 7. This blade 5 has an extension 8, upon which is secured a foot piece 9 and a back stop 11. The blade 6 has an upwardly extending handle 12 secured thereto and it is through the medium of this handle that the device is actuated.

Referring now particularly to Fig. 1, it will be noted that when the foot is placed upon the extension 8 so as to rest upon the plate 9, as shown in this figure, the back stop 11 will enter the ground and by then moving the handle 12 toward the right of the drawing, a shearing action will occur. By now moving the handle toward the left of the drawing and releasing the foot, the blade 5 and its extension 8 will be advanced toward the left of the drawing so that when pressure is again placed on the extension 8, the back stop will come to rest in a new spot and the cycle will be completed. In other words by manipulating the handle 12 back and forth, a creeping action will be given to the tool, which creeping action will permit the rapid and efficient trimming of the grass being operated upon.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a device of the character described, a pair of cutting elements pivoted one to the other and normally operatable substantially in a vertical plane, one of said elements having an extension formed thereon and extending rearwardly therefrom, a foot plate mounted on said extension, a back stop secured to the end of said extension, said back stop having a downwardly extending cutting edge and being capable of penetrating a ground surface when pressure is applied to said foot plate, the other of said cutting elements having a handle connected thereto and extending upwardly and rearwardly, whereby said blades may be operated.

RAYMOND H. HOSKINS.